United States Patent
Khawer et al.

(10) Patent No.: US 9,775,153 B2
(45) Date of Patent: Sep. 26, 2017

(54) ALLOCATION OF UNLICENSED FREQUENCY BANDS FOR A WIRELESS HOTSPOT

(71) Applicants: Mohammad R. Khawer, Lake Hopatcong, NJ (US); Colin Kahn, Morris Plains, NJ (US); Robert A. Soni, Randolph, NJ (US)

(72) Inventors: Mohammad R. Khawer, Lake Hopatcong, NJ (US); Colin Kahn, Morris Plains, NJ (US); Robert A. Soni, Randolph, NJ (US)

(73) Assignee: Alcatel Lucent, Boulogne-Billancourt (FR)

(*) Notice: Subject to any disclaimer, the term of this patent is extended or adjusted under 35 U.S.C. 154(b) by 121 days.

(21) Appl. No.: 14/607,772

(22) Filed: Jan. 28, 2015

(65) Prior Publication Data
US 2016/0219589 A1    Jul. 28, 2016

(51) Int. Cl.
H04W 4/00    (2009.01)
H04W 72/04    (2009.01)
H04W 24/02    (2009.01)
H04W 88/06    (2009.01)
H04W 88/04    (2009.01)
H04W 16/14    (2009.01)

(52) U.S. Cl.
CPC ....... *H04W 72/0453* (2013.01); *H04W 24/02* (2013.01); *H04W 16/14* (2013.01); *H04W 88/04* (2013.01); *H04W 88/06* (2013.01)

(58) Field of Classification Search
CPC ............ H04W 72/04; H04W 72/0406; H04W 72/0413; H04W 72/042; H04W 72/044; H04W 72/0453; H04W 24/02; H04W 88/06
See application file for complete search history.

(56) References Cited

U.S. PATENT DOCUMENTS

| | | | |
|---|---|---|---|
| 2012/0077510 A1* | 3/2012 | Chen ................ | H04W 28/26 455/452.1 |
| 2012/0134328 A1* | 5/2012 | Gauvreau ............ | H04L 5/0037 370/329 |
| 2012/0307744 A1 | 12/2012 | Charbit et al. | |
| 2013/0077542 A1 | 3/2013 | Yang et al. | |
| 2013/0155991 A1* | 6/2013 | Kazmi ............. | H04W 72/0453 370/329 |
| 2013/0176934 A1 | 7/2013 | Malladi et al. | |
| 2013/0210346 A1* | 8/2013 | Ling .................... | H04W 4/008 455/41.1 |
| 2013/0237148 A1* | 9/2013 | McCann .............. | H04W 4/008 455/41.1 |

(Continued)

OTHER PUBLICATIONS

International Search Report and Written Opinion correlating to PCT/US16/014216 dated Apr. 11, 2016, 13 pages.

(Continued)

*Primary Examiner* — Kevin Mew
(74) *Attorney, Agent, or Firm* — Davidson Sheehan LLP

(57) ABSTRACT

User equipment aggregates connections in at least one of a first unlicensed frequency band and a second unlicensed frequency band with a connection in a licensed frequency band to form a wireless backhaul connection to the user equipment. The user equipment selectively allocates a third unlicensed frequency band to a tethering connection.

20 Claims, 9 Drawing Sheets

(56) References Cited

U.S. PATENT DOCUMENTS

| | | | | |
|---|---|---|---|---|
| 2013/0337821 | A1* | 12/2013 | Clegg | H04L 5/0062 455/452.1 |
| 2014/0010086 | A1* | 1/2014 | Etemad | H04B 7/0632 370/235 |
| 2014/0050086 | A1* | 2/2014 | Himayat | H04N 21/2365 370/230 |
| 2014/0287769 | A1* | 9/2014 | Taori | H04W 74/0808 455/450 |
| 2014/0378157 | A1* | 12/2014 | Wei | H04W 16/14 455/454 |
| 2015/0085797 | A1* | 3/2015 | Ji | H04J 3/16 370/329 |
| 2015/0103777 | A1* | 4/2015 | Chen | H04L 5/0044 370/329 |
| 2015/0110066 | A1* | 4/2015 | Gaal | H04W 72/0453 370/330 |
| 2015/0223243 | A1* | 8/2015 | Tabet | H04W 28/085 370/330 |
| 2015/0245232 | A1* | 8/2015 | Luo | H04W 24/08 370/252 |
| 2015/0245327 | A1* | 8/2015 | Damnjanovic | H04W 16/14 370/336 |
| 2015/0263837 | A1* | 9/2015 | Patel | H04L 27/0006 370/329 |
| 2015/0349931 | A1* | 12/2015 | Damnjanovic | H04L 5/0007 370/280 |
| 2015/0351095 | A1* | 12/2015 | Wilhelmsson | H04W 72/0453 370/329 |
| 2016/0043854 | A1* | 2/2016 | Damnjanovic | H04L 5/0048 370/329 |
| 2016/0050004 | A1* | 2/2016 | Mallik | H04B 7/0626 370/329 |
| 2016/0119924 | A1* | 4/2016 | Lindoff | H04W 16/14 370/338 |
| 2016/0165604 | A1* | 6/2016 | Khawer | H04W 16/14 455/452.1 |
| 2016/0183220 | A1* | 6/2016 | Rashid | H04W 72/042 370/329 |
| 2016/0183243 | A1* | 6/2016 | Park | H04W 72/0413 370/329 |

OTHER PUBLICATIONS

3GPP-Draft, "Views on LAA for Unlicensed Spectrum—Scenarios and Initial Evaluation Results—NTT Docomo, Inc.", RWS-140026 LTE-U Scenarios, 3rd Generation Partnership Project (3GPP), Mobile Competence Centre; Sophia Antipolis, France, Jun. 13, 2014, 12 pages.

3GPP-Draft, "Discussion on LTE in Unlicensed Spectrum", RWS-140021, 3rd Generation Partnership Project (3GPP), Mobile Competence Centre; Sophia Antipolis, France, Jun. 13, 2014, 24 pages.

* cited by examiner

US 9,775,153 B2

ALLOCATION OF UNLICENSED FREQUENCY BANDS FOR A WIRELESS HOTSPOT

BACKGROUND

Field of the Disclosure

The present disclosure relates generally to wireless communication systems and, more particularly, to wireless hotspots in wireless communication systems.

Description of the Related Art

The demand for mobile wireless data has been growing at an exponential rate and is expected to continue to grow by many orders of magnitude in the coming years. Meeting the increasing demand will require a corresponding increase in the amount of spectrum available for wireless communication. The available spectrum can be increased by combining licensed frequency bands with unlicensed frequency bands. Unlicensed frequency bands are portions of the radiofrequency spectrum that do not require a license for use and may therefore be used by any device to transmit or receive radio frequency signals. For example, the Unlicensed National Information Infrastructure (UNII) is formed of portions of the radio spectrum that include frequency bands in the range of 5.15 GHz to 5.825 GHz such as the U-NII-1 band in the range 5.15-5.25 GHz, the U-NII 2a, b, c bands in the range 5.25-5.725 GHz, and the U-NII 3 band in the range 5.725-5.825 GHz. Unlicensed frequency bands can be contrasted to licensed frequency bands that are licensed to a particular service provider and may only be used for wireless communication that is authorized by the service provider.

In order to take advantage of the bandwidth provided in the licensed spectrum and the unlicensed spectrum, user equipment can implement multiple radios for concurrent access to interfaces in the licensed frequency bands and the unlicensed frequency bands according to different radio access technologies. For example, user equipment may implement a radio to support an LTE interface in the licensed spectrum (LTE-L), a radio to support an LTE interface in the unlicensed spectrum (LTE-U), and a radio to support a Wi-Fi interface in the unlicensed spectrum. The different radios must be sufficiently isolated from each other to prevent collisions of transmitted or received signals. For example, a typical Wi-Fi transmit power of a smart phone is approximately 18 dBm and the in-band blocking requirement for LTE is −30 dBm, which implies that the Wi-Fi transmitter and the LTE receiver must be isolated from each other by at least 48 dBm. Frequency separation can provide sufficient isolation between the licensed frequency bands and the unlicensed frequency bands. However, there is no guarantee that signals transmitted by different nodes in the unlicensed frequency bands will be isolated from each other by frequency separation.

SUMMARY OF EMBODIMENTS

The following presents a summary of the disclosed subject matter in order to provide a basic understanding of some aspects of the disclosed subject matter. This summary is not an exhaustive overview of the disclosed subject matter. It is not intended to identify key or critical elements of the disclosed subject matter or to delineate the scope of the disclosed subject matter. Its sole purpose is to present some concepts in a simplified form as a prelude to the more detailed description that is discussed later.

In some embodiments, a method is provided for allocating unlicensed frequency bands to wireless hotspots. The method includes aggregating, at a first user equipment, connections in at least one of a first unlicensed frequency band and a second unlicensed frequency band with a connection in a licensed frequency band to form a wireless backhaul connection to the user equipment. The method also includes selectively allocating, at the first user equipment, a third unlicensed frequency band to a tethering connection.

In some embodiments, user equipment is provided to allocate unlicensed frequency bands that support a wireless hotspot. The user equipment includes a transceiver to aggregate connections in at least one of a first unlicensed frequency band and a second unlicensed frequency band with a connection in a licensed frequency band to form a wireless backhaul connection to the user equipment. The user equipment also includes a processor to selectively allocate a third unlicensed frequency band to a tethering connection.

BRIEF DESCRIPTION OF THE DRAWINGS

The present disclosure may be better understood, and its numerous features and advantages made apparent to those skilled in the art by referencing the accompanying drawings. The use of the same reference symbols in different drawings indicates similar or identical items.

DETAILED DESCRIPTION

Figure 1:
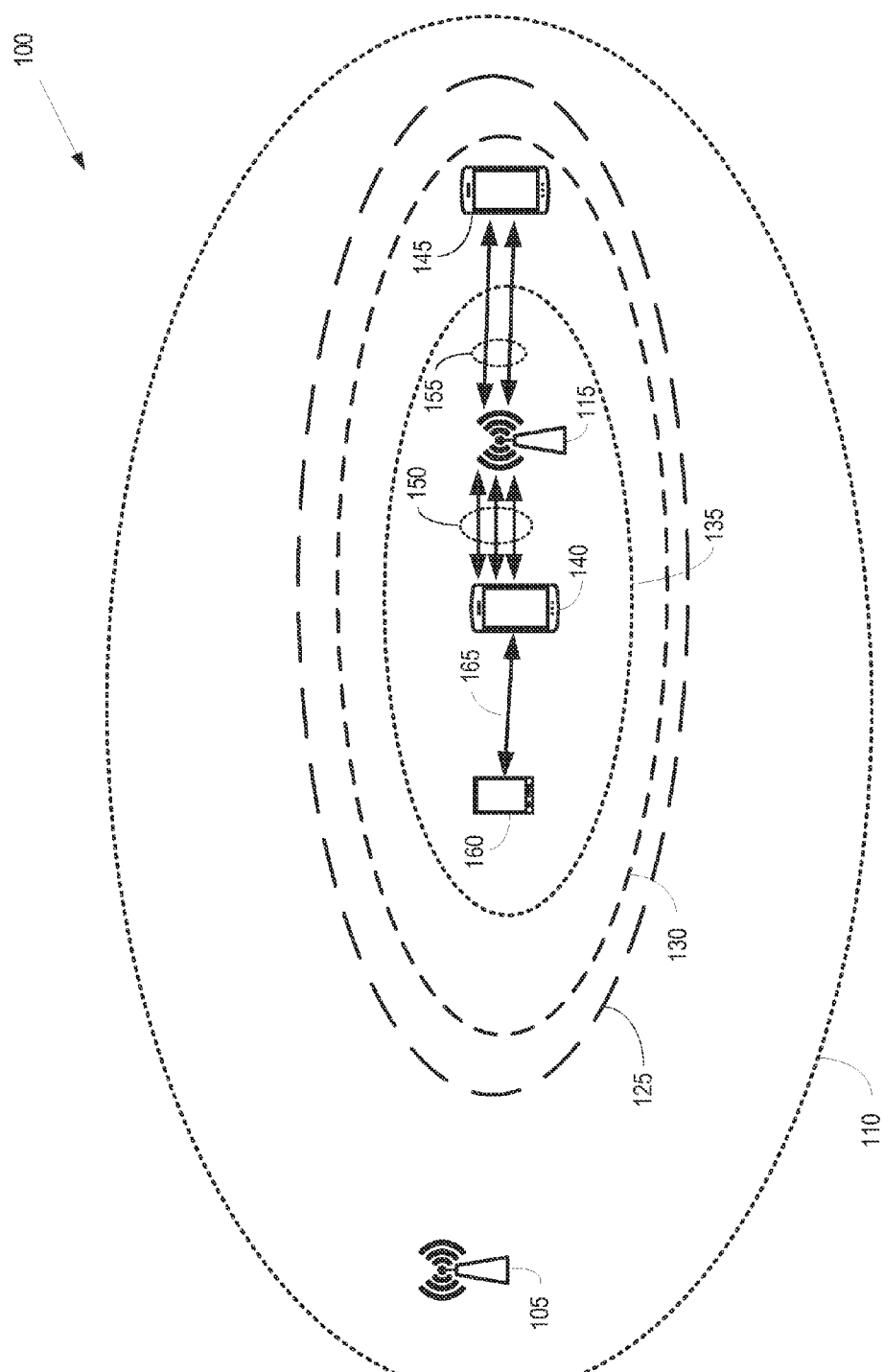
FIG. 1 is a diagram of a wireless communication system according to some embodiments.

User equipment, such as smartphones or standalone wireless mobile hotspots, can be used to provide wireless coverage to other user equipment in a wireless local area network (WLAN). This technique may be referred to as tethering. For example, an iPhone may be used to provide wireless connectivity to a nearby iPad in an unlicensed frequency band, thereby tethering the iPad to the iPhone. The user equipment that is providing the hotspot also forms a wireless backhaul connection to the network. The wireless backhaul connection may utilize one or more licensed or unlicensed frequency bands. However, the unlicensed frequency bands used for a tethering connection to the wireless hotspot may be the same as one or more of the unlicensed frequency bands used for the wireless backhaul connection. For example, the LTE-U and Wi-Fi connections that are aggregated to form the wireless backhaul connection may share the 5 GHz unlicensed frequency band with the unlicensed frequency band used for the tethering connection. Interference between the transmissions over the wireless backhaul connection and the tethering connection may exceed the frequency isolation requirement (e.g., of 48 dB between radios) and degrade the quality of the communications for the wireless backhaul connection and the tethering connection, potentially rendering both inoperative.

A tethering connection that uses unlicensed frequency bands can coexist (in the same user equipment) with a wireless backhaul connection that also uses unlicensed frequency bands if the user equipment selectively allocates the tethering connection a first unlicensed frequency band that is different than one or more second unlicensed frequency bands that are aggregated with a licensed frequency band to support the wireless backhaul connection. For example, if LTE-L, LTE-U, and Wi-Fi connections are available, the user equipment may aggregate the three connections to form a wireless backhaul connection if the LTE-U and Wi-Fi connections are deployed in different unlicensed frequency bands, such as the UNII-1 and UNII-3 bands of the 5 GHz unlicensed frequency band. If the LTE-U and Wi-Fi connections are deployed in the same unlicensed frequency band, the user equipment selects the connection with the best signal strength or channel quality to aggregate with the LTE-L connection. The user equipment may then allocate a different unlicensed frequency band to a Wi-Fi tethering connection. For example, if the LTE-U connection is implemented in the 5 GHz unlicensed frequency band, a 2.4 GHz unlicensed frequency band may be allocated to the Wi-Fi tethering connection. For another example, if the Wi-Fi connection is implemented in the 5 GHz unlicensed frequency band and the LTE-U radios are disabled, clear channels in the 5 GHz unlicensed frequency band may be allocated to the Wi-Fi tethering connection. For yet another example, if both the LTE-U and Wi-Fi backhaul connections are enabled in the 5 GHz unlicensed frequency band, clear channels in the 5 GHz unlicensed frequency band or the 2.4 GHz unlicensed frequency band be allocated to the Wi-Fi tethering connection, depending on channel usage by the Wi-Fi backhaul connection.

FIG. 1 is a diagram of a wireless communication system 100 according to some embodiments. The wireless communication system 100 includes one or more macrocellular eNodeBs 105 that provide wireless connectivity according to a first radio access technology, e.g., according to the Long Term Evolution (LTE) standards defined by the Third Generation Partnership Project (3GPP). The eNodeB 105 provides wireless connectivity within a first geographical area or cell 110. The wireless communication system 100 also includes one or more small cells 115 that provide wireless connectivity in geographic areas 125, 130, 135 that partially or completely overlap with the macrocell 110. As used herein, the term "base station" may be used to indicate eNodeBs that are part of a macrocellular network or small cells that overlay the macrocellular network. Small cells may also be referred to as home base station routers, metrocells, microcells, picocells, femtocells, and the like.

The small cell 115 includes (or is associated with) functionality that supports wireless communication according to multiple radio access technologies. For example, the small cell 115 may include radios that support wireless communication according to LTE standards and Wi-Fi radios that support wireless communication according to 802.11 standards developed by the IEEE. The functionality for the multiple radio access technologies may be integrated into a single device or may be implemented in co-located devices. For example, the small cell 115 may be an integrated device that includes both the LTE radios and Wi-Fi radios or the small cell 115 may include an LTE small cell that is co-located with a Wi-Fi access point. In either case, the term "small cell" will be understood to encompass the integrated or co-located devices that are used to support wireless communication according to the multiple radio access technologies.

The small cell 115 supports uplink or downlink communications over carriers in a licensed frequency band within the cell indicated by the dashed oval 125. The carriers in the licensed frequency band may be referred to as LTE licensed (LTE-L) carriers. The small cell 115 also supports wireless connectivity according to a first radio access technology such as LTE over carriers in one or more unlicensed frequency bands within a cell indicated by the dashed oval 130. The carriers in the unlicensed frequency band may be referred to as LTE unlicensed (LTE-U) carriers. The small cell 115 may also support wireless connectivity according to a second radio access technology such as Wi-Fi over carriers in one or more unlicensed frequency bands within a cell indicated by the dashed oval 135. These unlicensed carriers may be referred to as Wi-Fi carriers.

The unlicensed frequency bands may include the Unlicensed National Information Infrastructure (UNII), which is formed of portions of the radio spectrum that include frequency bands in the range of 5.15 GHz to 5.825 GHz such as the U-NII-1 band in the range 5.15-5.25 GHz, the U-NII 2a, b, c bands in the range 5.25-5.725 GHz, and the U-NII 3 band in the range 5.725-5.825 GHz. The unlicensed frequency bands may also include a 2.4 GHz frequency band. As used herein, the term "frequency band" is generally used to refer to a range of frequencies that can be used for wireless communication. The term "frequency band" may also be used to refer to a range of frequencies that encompasses other frequency bands that have smaller frequency ranges and may be independently allocated for wireless communication. For example, the 5 GHz frequency band may encompass the UNII-1, UNII-2, and UNII-3 frequency bands, which may also be referred to as frequency subbands. The frequency subbands may be further subdivided into frequency bands that have a smaller bandwidth. For example, the UNII-2 frequency subband may be subdivided into channels that have bandwidths of 20 MHz, 40 MHz, 80 MHz, 160 MHz, and the like.

The small cell 115 supports wireless communication with user equipment 140, 145 using different radios that support communication in the licensed and unlicensed frequency bands according to the different radio access technologies. The range of the small cell 115 is limited by uplink or downlink power limitations. For example, the small cell 115 may transmit relatively high power signals (e.g., 5 watts on the downlink) in the licensed frequency band and a lower power in the LTE-U and Wi-Fi unlicensed frequency bands (e.g., 1 W on the downlink). Some embodiments of the small cell 115 are uplink-limited by limitations on the uplink transmission power. For example, the uplink transmission power in LTE-U may be limited to 200 mW and the uplink transmission power in Wi-Fi may be limited to 100 mW. Consequently, the cell 125 is larger than the cell 130, which is in turn larger than the cell 135. However, some embodiments of the small cell 115 may be subject to different power limitations in the different frequency bands, which may lead to corresponding differences in the relative sizes of the cells 125, 130, 135.

Different sets of carriers in the licensed and unlicensed frequency bands are available to different user equipment 140, 145 depending on their location relative to the small cell 115. For example, the user equipment 140 is within the boundaries of the cells 125, 130, 135 and consequently a set 150 of carriers operating according to the multiple radio access technologies (e.g., LTE-L, LTE-U, and Wi-Fi) supported by the small cell 115 are available to the user equipment 140. For another example, the user equipment 145 is within the boundaries of the cells 125, 130 but the user equipment 145 is outside the boundary of the cell 135. A set 155 of carriers operating according to some of the radio access technologies (e.g., LTE-L and LTE-U) is therefore available to the user equipment 145. Some embodiments of the user equipment 140, 145 can detect the sets 150, 155 of carriers based on pilot signal measurements, beacon signal measurements, long-term energy detection, preamble detection, overhead channel detection, and the like.

The unlicensed carriers in the sets 150, 155 may operate in different operating modes. For example, the small cell 115 may implement a supplemental downlink carrier in the unlicensed frequency band according to LTE-U. The supplemental downlink carrier is used to carry best effort downlink data from the small cell 115 to the user equipment 140, 145. A primary carrier is anchored in the licensed frequency band (LTE-L) and is used to carry control data for the supplemental downlink carrier, as well as uplink data from the user equipment 140, 145 to the small cell 115. For another example, the small cell 115 may implement a carrier aggregation mode in which a secondary carrier in the unlicensed frequency band carries both uplink and downlink best effort data. A primary carrier is anchored in the licensed frequency band and is used to carry control data for the secondary carrier. Carrier grade Wi-Fi may be used to convey control, uplink, and downlink signals between the small cell 115 and the user equipment 140 over carriers in the unlicensed frequency band.

User equipment 140, 145 are configured to provide wireless connectivity to other user equipment 160 over a carrier 165 in an unlicensed frequency band. Although the user equipment 140, 145 are depicted as end-user devices such as smart phones, some embodiments of the user equipment 140, 145 are not end-user devices and may instead be configured to provide wireless connectivity to the user equipment 160 without necessarily providing any end-user functionality. The user equipment 140, 145 may therefore be referred to as "personal hotspots" or "wireless mobile hotspots." The connection between the user equipment 140 and the user equipment 160 is referred to herein as a "tethering connection" and the user equipment 160 is referred to as being "tethered" to the user equipment 140. Although the user equipment 160 is deployed within the cell 135 in FIG. 1, the range of the tethering connection 165 is set by the properties of the user equipment 140, 160 and the environment. The range of the tethering connection 165 does not necessarily correspond to the geographic boundaries of the cells 125, 130, 135. The user equipment 140, 145 can also establish a wireless backhaul connection to the wireless communication system 100 by aggregating the sets 150, 155 of carriers. Some embodiments of the user equipment 140, 145 may therefore multiplex packets into subflows conveyed over carriers in the sets 150, 155 of aggregated carriers.

The user equipment 140, 145 allocate frequency bands to the carriers for the tethering connection 165 and the wireless backhaul connection to maintain a predetermined level of isolation between the radios that support communication in the allocated frequency bands. For example, the user equipment 140, 145 may allocate the frequency bands for the tethering connection and the wireless backhaul connection to maintain a 48 dB isolation between different radios, such as radios that operate according to the LTE radio access technology (RAT) and radios that operate according to the Wi-Fi RAT. Selectively allocating the frequency bands to the tethering connection and the wireless backhaul connection enables the user equipment 140, 145 reduce or substantially eliminate interference between the signals transmitted by or received at the radios operating according to the different RATs, thereby improving the channel quality over the tethering connection 165 and the wireless backhaul connection.

Figure 2:
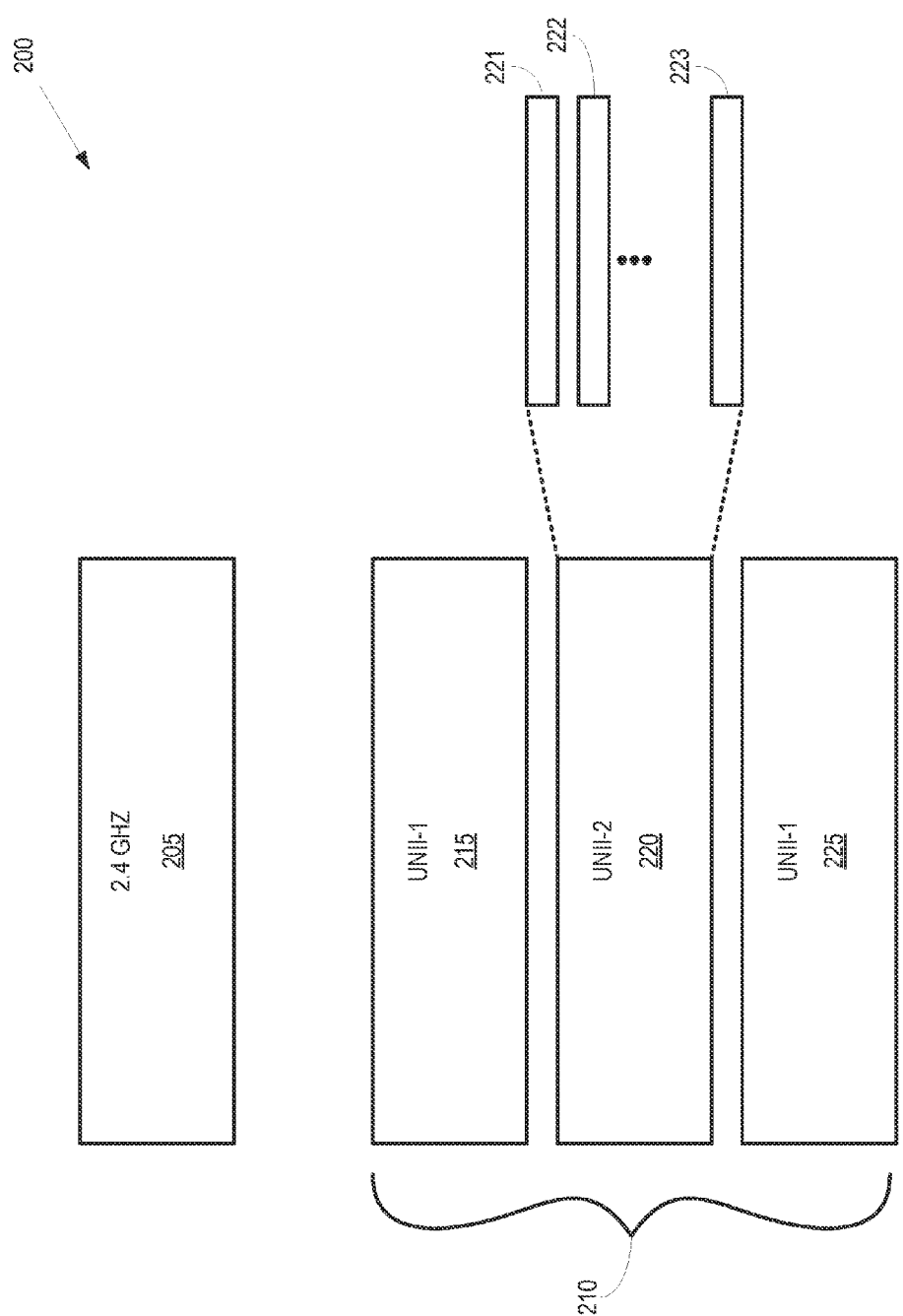
FIG. 2 is a diagram of unlicensed frequency bands that can be allocated to a tethering connection or a wireless backhaul connection according to some embodiments.

FIG. 2 is a diagram of unlicensed frequency bands 200 that can be allocated to a tethering connection or a wireless backhaul connection according to some embodiments. Frequency increases from top to bottom in FIG. 2. The unlicensed frequency bands 200 include a first frequency band 205 at 2.4 GHz and a second frequency band 210 at 5 GHz. The second frequency band 210 is further subdivided into three subbands corresponding to the UNII-1 subband 215, the UNII-2 subband 220, and the UNII-3 subband 225. Each of the subbands may further be subdivided into frequency channels that can be independently allocated to the tethering connection or the wireless backhaul connection. For example, the UNII-2 subband 220 includes frequency channels 221, 222, 223.

Figure 3:
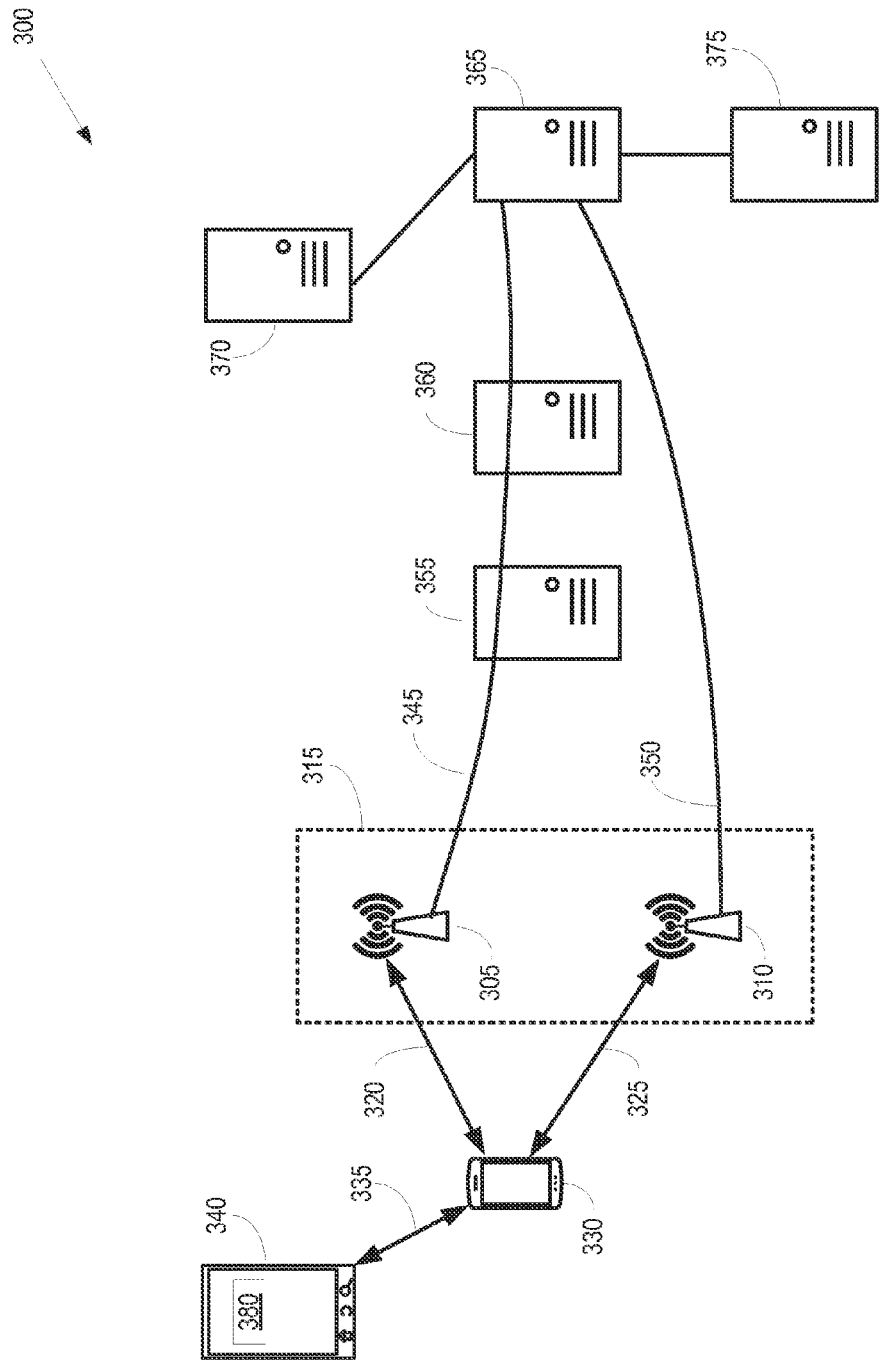
FIG. 3 is a diagram of a wireless communication system that terminates aggregated wireless backhaul connections in a core data network according to some embodiments.

FIG. 3 is a diagram of a wireless communication system 300 that terminates aggregated wireless backhaul connections in a core data network according to some embodiments. The wireless communication system 300 includes a base station 305 that operates according to a first radio access technology (such as LTE) and an access point 310 that operates according to a second radio access technology (such as Wi-Fi). The base station 305 and the access point 310 may be integrated into a single device or co-located to form a small cell 315. The base station 305 and the access point 310 in the small cell 315 form wireless connections 320, 325 with user equipment 330. The wireless connections 320, 325 are used to convey uplink or downlink signals between the user equipment 330 and the small cell 315.

The user equipment 330 operates as a wireless mobile hotspot and may therefore form a wireless tethering connection 335 to another user equipment 340. The wireless connections 320, 325 can then be aggregated by the user equipment 330 to form a wireless backhaul connection so that the user equipment 340 may establish a communication pathway via the tethering connection 335, the user equipment 330, and the wireless backhaul connection that includes the wireless connections 320, 325.

The base station 305 and the access point 310 in the small cell 315 have separate connections 345, 350 to the wireless communication system 300. The connections 345, 350 may be wired connections or wireless connections. For example, the base station 305 may use a wireless backhaul connection such as a microwave connection to an aggregation point (not shown in FIG. 3) for wireless backhaul connections. For another example, the small cell 315 may use non-ideal-line-of-sight backhaul connectivity methods including radiofrequency wireless backhaul connections. In the illustrated embodiment, the wireless communication system 300 includes a wireless packet core that includes a serving gateway 355 to route and forward user data packets, as well as acting as a mobility anchor during handovers. The wireless packet core also includes a public data network (PDN) gateway 360 to provide connectivity from user equipment to external packet data networks.

The wireless communication system 300 also includes a content delivery network (CDN) server 365. In the illustrated embodiment, the content delivery network server 365 implements protocols for terminating the backhaul connections 345, 350 associated with the aggregated wireless connections 320, 325 in the wireless backhaul connection. For example, the content delivery network server 365 may implement the multipath transmission control protocol (MPTCP) to present a standard TCP interface to applications while spreading the data on a per-packet basis over multiple subflows. For another example, the content delivery network server 365 may implement a multipath real-time protocol (MPRTP) to support the multiple subflows. A policy server 370 may be used to provide policies used by the content delivery network 365 to control the multiple subflows, e.g., according to MPTCP or MPRTP. An application server 375 may also be connected to the content delivery network server 365 to support applications such as an application client 380 implemented by the user equipment 340.

Figure 4:
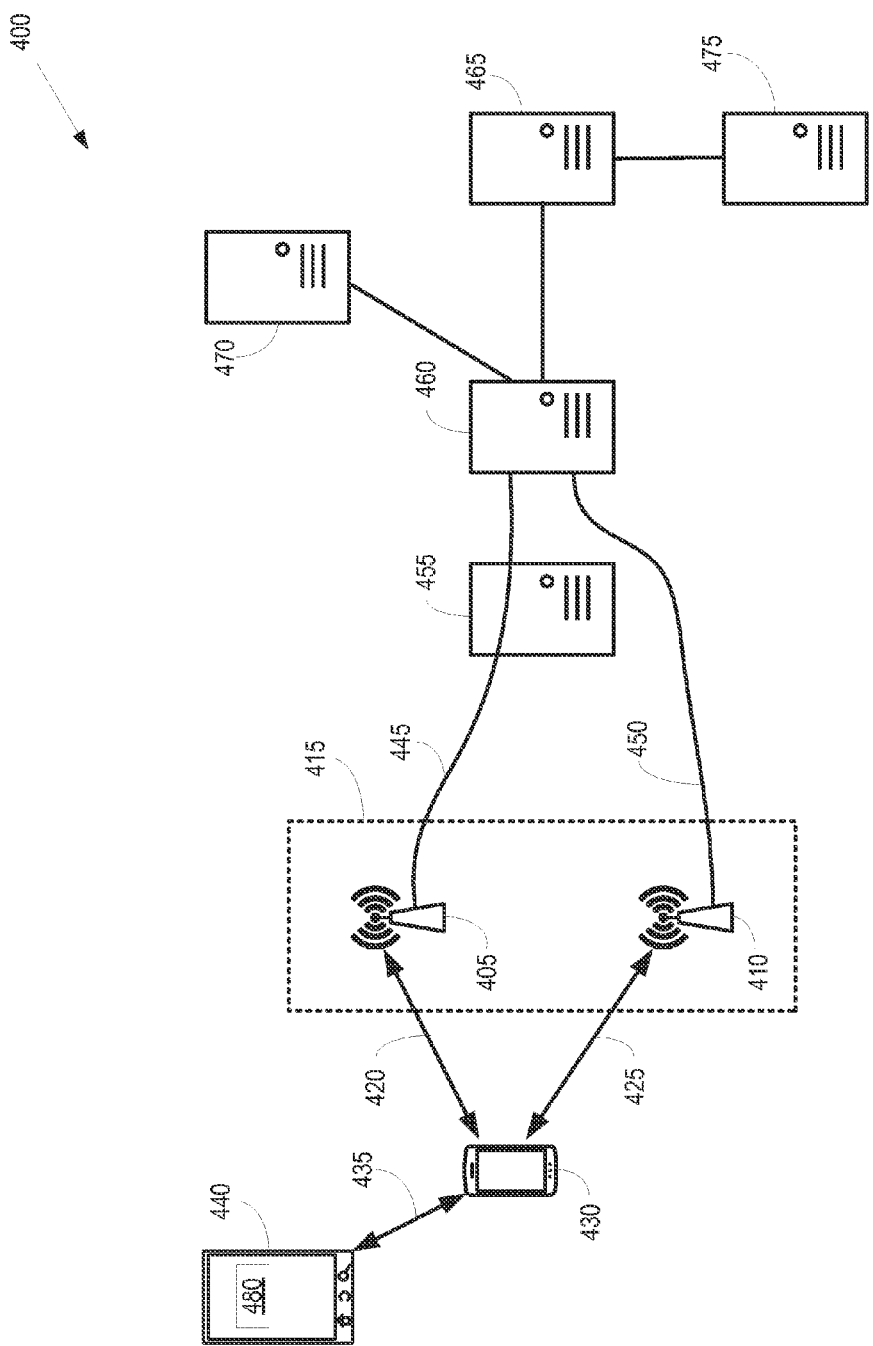
FIG. 4 is a diagram of a wireless communication system that terminates aggregated wireless backhaul connections in a PDN gateway according to some embodiments.

FIG. 4 is a diagram of a wireless communication system 400 that terminates aggregated wireless backhaul connections in a PDN gateway according to some embodiments. The wireless communication system 400 includes a base station 405 that operates according to a first radio access technology (such as LTE) and an access point 410 that operates according to a second radio access technology (such as Wi-Fi). The base station 405 and the access point 410 may be integrated into a single device or co-located to form a small cell 415. The base station 405 and the access point 410 in the small cell 415 form wireless connections 420, 425 with user equipment 430. The wireless connections 420, 425 are used to convey uplink or downlink signals between the user equipment 430 and the small cell 415.

The user equipment 430 operates as a wireless mobile hotspot and may therefore form a wireless tethering connection 435 to another user equipment 440. The wireless connections 420, 425 can then be aggregated by the user equipment 430 to form a wireless backhaul connection so that the user equipment 440 may establish a communication pathway via the tethering connection 435, the user equipment 430, and the wireless backhaul connection that includes the wireless connections 420, 425. The base station 405 and the access point 410 in the small cell 415 have separate wired or wireless connections 445, 450 to the wireless communication system 300, as discussed herein with regard to the wireless communication system 300 shown in FIG. 3.

In the illustrated embodiment, the wireless communication system 400 includes a wireless packet core that includes a serving gateway 455 and a PDN gateway 460, a content delivery network (CDN) server 465, a policy server 470, and an application server 475 to support applications such as an application client 480 implemented by the user equipment 440. These elements may operate in a manner similar to corresponding elements in the embodiment of the wireless communication system 300 shown in FIG. 3. However, in the embodiment shown in FIG. 4, the backhaul connections 445, 450 associated with the aggregated wireless connections 420, 425 in the wireless backhaul connection are terminated at the PDN gateway 460. Thus, the PDN gateway 460 implements protocols for terminating the wired connections 445, 450 such as MPTCP or MPRTP. The policy server 470 may be used to provide policies used by the PDN gateway 460 to control the multiple subflows on a per-packet basis, e.g., according to MPTCP or MPRTP.

Figure 5:
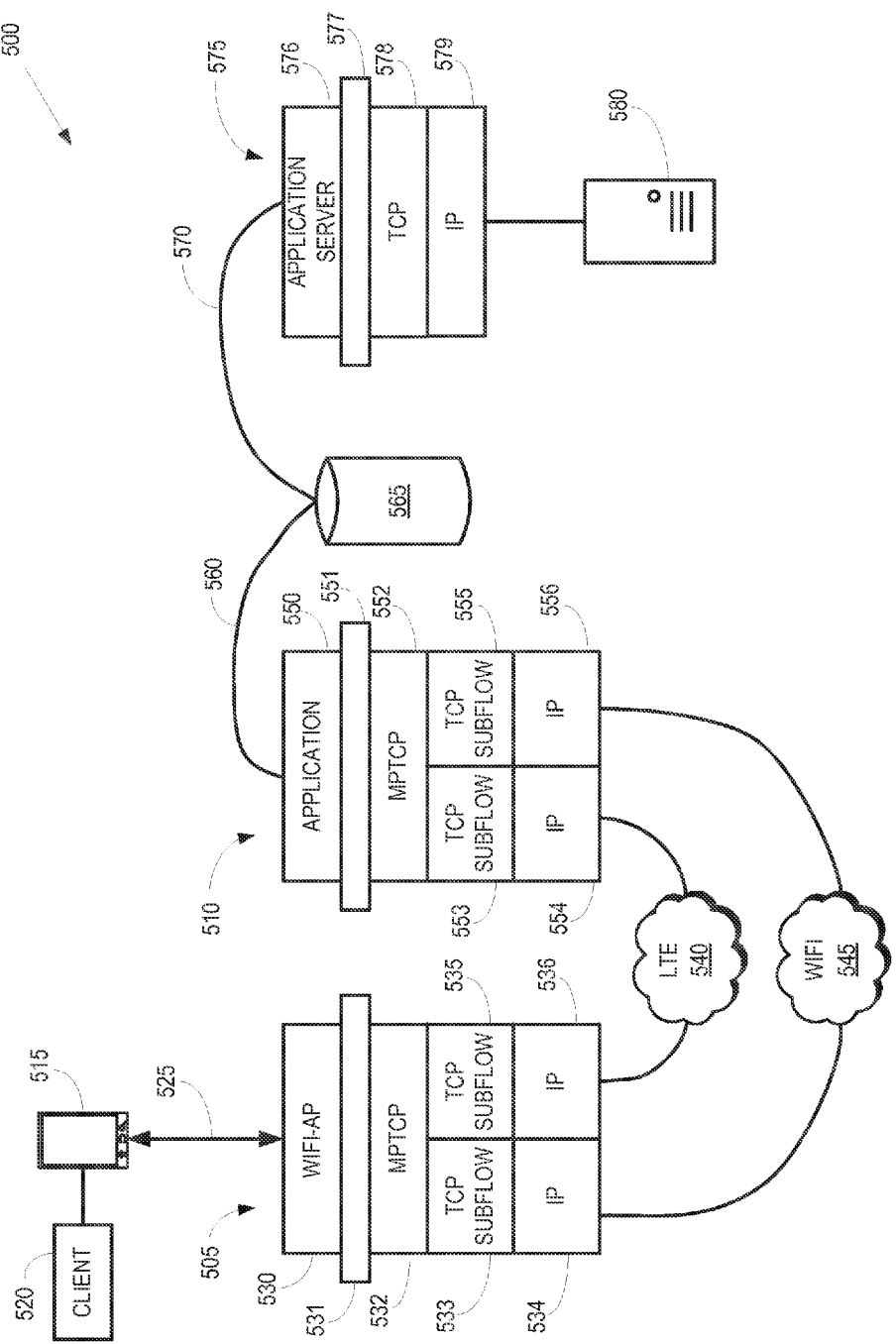
FIG. 5 is a diagram of a protocol stack according to some embodiments.

FIG. 5 is a diagram of a protocol stack 500 according to some embodiments. The protocol stack 500 may be used to implement some embodiments of the wireless communication system 300 that terminates aggregated wireless backhaul connections for mobile wireless hotspot 505 at a content delivery network (CDN) 510. For example, the mobile wireless hotspot 505 may be used to implement some embodiments of the user equipment 330 shown in FIG. 3 and the content delivery network 510 may be used to implement some embodiments of the content delivery network 365 shown in FIG. 3. The protocol stack 500 may also be modified to implement some embodiments of the wireless communication system 400 shown in FIG. 4 that terminates aggregated wireless backhaul connections for the mobile wireless hotspot 505 at a PDN gateway (not shown in FIG. 5) by replacing the content delivery network stack with a corresponding PDN gateway stack.

The protocol stack 500 includes user equipment 515 that implements a client application 520. The user equipment 515 is tethered to the mobile wireless hotspot 505 by a tethering connection 525. In the illustrated embodiment, the tethering connection 525 is implemented according to a Wi-Fi radio access technology and so the portion of the protocol stack 500 implemented in the mobile wireless hotspot 505 includes a Wi-Fi access point layer 530 that uses a socket application programming interface (API) 531 to connect to an MPTCP layer 532, which terminates multiple subflows that are aggregated to form a wireless backhaul connection to the content delivery network 510. For example, the MPTCP layer 532 can multiplex or distribute packets on a per-packet basis to the multiple subflows. A first TCP subflow is indicated by a first Internet protocol (IP) address and is handled in the protocol stack 500 by corresponding TCP subflow layer 533 and IP layer 534. The first TCP subflow operates according to the Wi-Fi radio access technology. A second TCP subflow is indicated by a second Internet protocol (IP) address and is handled in the protocol stack 500 by corresponding TCP subflow layer 535 and IP layer 536. The second TCP subflow operates according to the LTE radio access technology.

The first and second subflows are conveyed using separate wireless communication links (such as the wireless connections in the sets 150, 155 shown in FIG. 1) through an LTE wireless network 540 and a Wi-Fi wireless network 545, respectively.

The aggregated first and second TCP subflows are terminated in the content delivery network 510. The portion of the protocol stack 500 implemented in the content delivery network 510 includes an application layer 550 that uses a socket API 551 to connect to an MPTCP layer 552, which terminates the multiple subflows that are aggregated to form the wireless backhaul connection to the content delivery network 510, e.g., by distributing or multiplexing packets on a per-packet basis to the multiple subflows. The first TCP subflow (indicated by the first IP address) is handled in the protocol stack 500 by corresponding TCP subflow layer 553 and IP layer 554. The second TCP subflow (indicated by the second IP address) is handled in the protocol stack 500 by corresponding TCP subflow layer 555 and IP layer 556.

A communication link 560 is used to convey packets associated with the first and second TCP subflows between the application layer 550 and higher layers 565 in the content delivery network. The communication link 570 is used to convey packets between the higher layers 565 and an application server 575 that includes an application layer 576, a socket API 577, a TCP layer 578, and an IP layer 579. A content storage source 580 may be connected to the application server 575. The content storage source 580 may be used to store information in packets received over the multiple aggregated subflows or to provide information for packets that are to be conveyed over the multiple aggregated subflows.

Figure 6A:
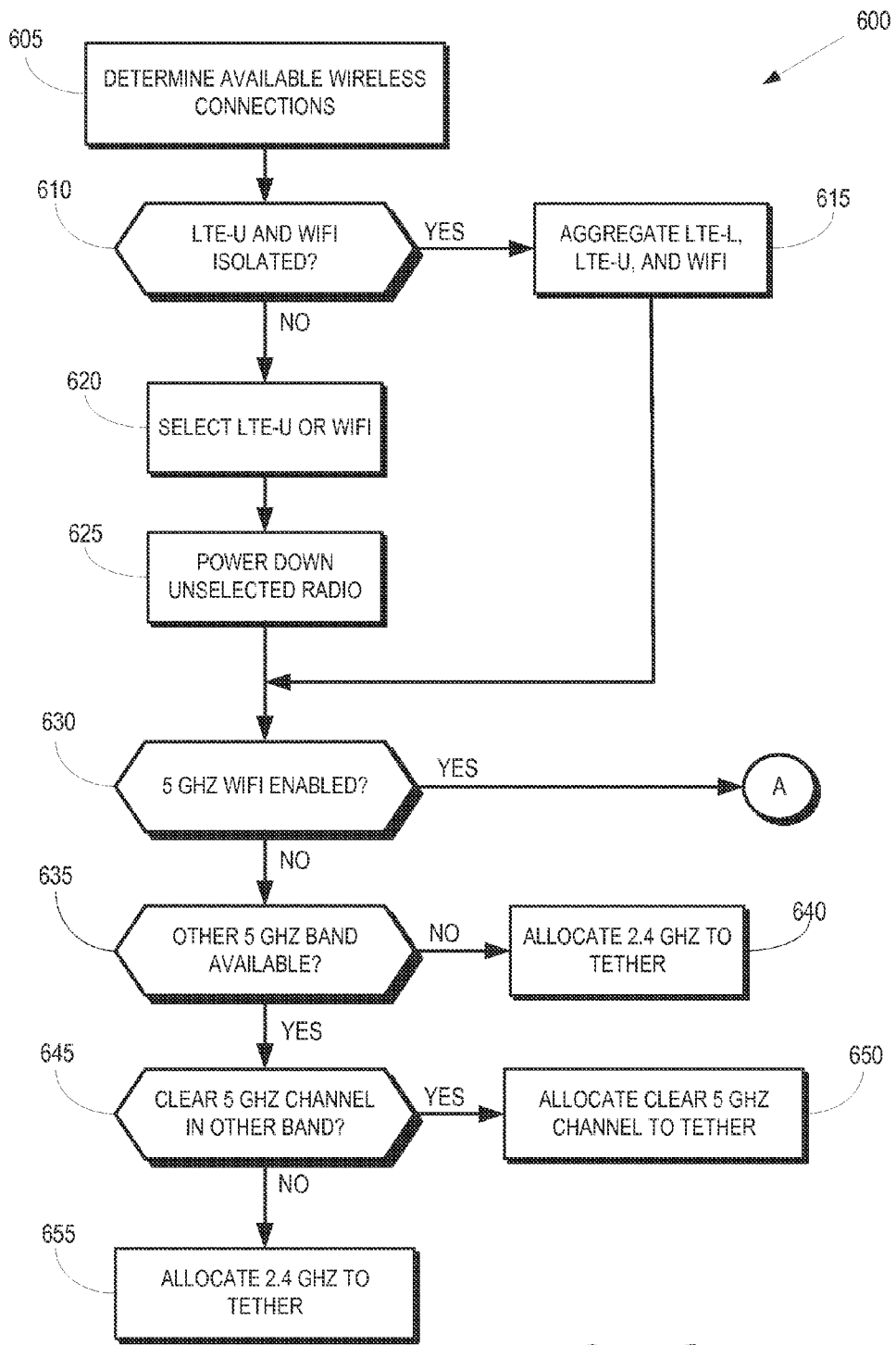
FIGS. 6A and 6B show a flow diagram of a method for allocating the licensed and unlicensed frequency bands to a tethering connection and a wireless backhaul connection according to some embodiments.
Figure 6B:
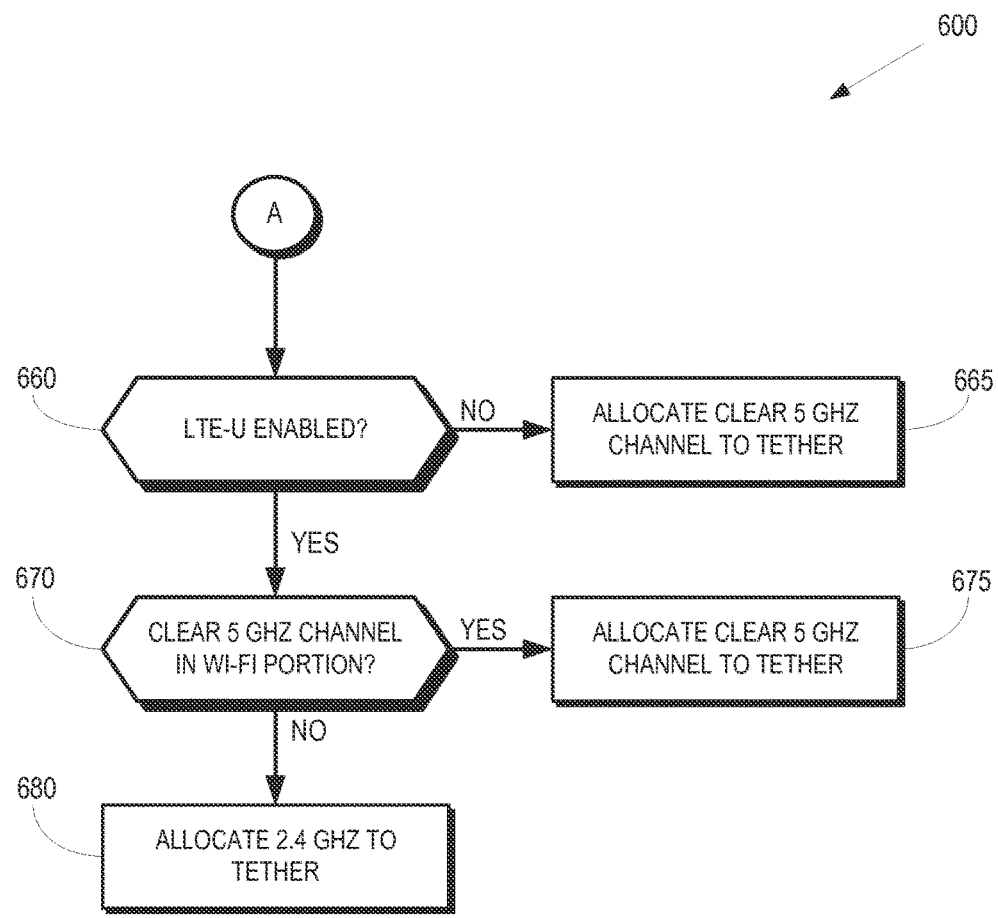

FIGS. 6A and 6B show a flow diagram of a method 600 for allocating the licensed and unlicensed frequency bands to a tethering connection and a wireless backhaul connection according to some embodiments. The method may be implemented in some embodiments of the user equipment 140, 145 shown in FIG. 1. At block 605, the user equipment determines the available wireless connections in licensed and unlicensed frequency bands. For example, the user equipment may monitor signals such as pilot signals or beacon signals transmitted in the licensed and unlicensed frequency bands. The user equipment determines that wireless connections are available if the measured signal strength for the signals received over the corresponding licensed or unlicensed frequency bands exceeds a detection threshold. In the illustrated embodiment, the user equipment determines that wireless connections are available in licensed and unlicensed frequency bands according to different RATs. For example, the user equipment may determine that an LTE-L wireless connection is available in a licensed frequency band, an LTE-U wireless connection is available in an unlicensed frequency band, and a Wi-Fi wireless connection is available in an unlicensed frequency band.

At decision block 610, the user equipment determines whether the wireless connections in the unlicensed frequency bands are allocated to unlicensed frequency bands supported by radios that are sufficiently isolated, e.g., they satisfy the 48 dB isolation requirement. For example, the user equipment may determine whether the LTE-U wireless connection provided by a corresponding LTE radio is sufficiently isolated from the Wi-Fi wireless connection provided by a corresponding Wi-Fi radio. If so, the user equipment forms (at block 615) a wireless backhaul connection by aggregating the available wireless connections in the different radio access technologies over the licensed and unlicensed frequency bands.

If the user equipment determines (at decision block 610) that the wireless connections in the unlicensed frequency bands are not sufficiently isolated, the user equipment selects (at block 620) a subset of the wireless connections to aggregate with the wireless connection in the licensed frequency band. For example, the user equipment may select either the LTE-U wireless connection or the Wi-Fi wireless connection. The selection may be performed based on measured parameters of signals in the corresponding unlicensed frequency bands. For example, the user equipment may select the LTE-U wireless connection if a signal strength or signal-to-noise ratio for a signal received in the corresponding unlicensed frequency band exceeds a signal strength or signal-to-noise ratio for a signal received in the unlicensed frequency band used by the Wi-Fi wireless connection. At block 625, the user equipment powers down the radio associated with the unselected wireless connection to conserve battery power.

The user equipment allocates an unlicensed frequency band to the tethering connection to ensure that the tethering connection can coexist with the wireless backhaul connection. In the embodiment depicted in FIG. 6, the available unlicensed frequency bands include a 2.4 GHz band and a 5 GHz band, which can be subdivided into sub bands and further subdivided into channels, as discussed herein. The LTE radio in the user equipment operates in the 5 GHz band and the Wi-Fi radio in the user equipment can operate in either the 2.4 GHz band or the 5 GHz band. However, other sets of unlicensed frequency bands may also be used in some embodiments.

At decision block 630, the user equipment determines whether the Wi-Fi radio is powered up to support the wireless backhaul connection in the 5 GHz band. If not, the user equipment knows that the LTE radio is powered up to support the wireless backhaul connection in the 5 GHz band and consequently the user equipment allocates (at block 635) the 2.4 GHz band to the tethering connection. The LTE-U radio may be operating in one frequency band of the 5 GHz band, such as UNII-3, which may leave other bands free for the tethering connection, such as UNII-1. At decision block 635, the user equipment determines whether another 5 GHz band is available. If not, the user equipment allocates (at block 640) the 2.4 GHz band to the tethering connection. If another 5 GHz band (such as UNII-1) is available and satisfies the isolation requirement, the user equipment determines (at decision block 645) whether a clear channel is available in the other band. Some embodiments of the user equipment determine whether channels are clear using long term energy detection, 802.11 preamble detection, LTE overhead channel detection, or device-assisted measurements. If a clear channel is found, the user equipment allocates (at block 650) the clear 5 GHz channel to the tethering connection. Otherwise, the user equipment allocates (at block 655) the 2.4 GHz band to the tethering connection.

The method 600 flows to block 660 if the Wi-Fi radio is powered up to support the wireless backhaul connection in the 5 GHz band. The user equipment determines (at decision block 660) whether the LTE-U radio is also powered up to support the wireless backhaul connection. If not, the user equipment allocates (at block 665) a clear channel in the 5 GHz band to the tethering connection. If the user equipment determines (at decision block 660) that both the Wi-Fi radio and the LTE-U radio are powered up to support the wireless backhaul connection in the 5 GHz band, then the Wi-Fi radio and the LTE-U radio should be operating in portions of the 5 GHz band that are isolated from each other. For example, the Wi-Fi radio may be operating in the UNII-1 band and the LTE-U radio may be operating in the UNII-3 band. The tethering connection should only be deployed in portions of the 5 GHz band that are allocated to the Wi-Fi radio. Thus, the user equipment searches (at decision block 670) for a clear channel in the portion of the 5 GHz band used by the Wi-Fi radio (e.g., UNII-1). If the user equipment finds a clear channel in the portion of the 5 GHz band used by the Wi-Fi radio, the user equipment allocates (at 675) the clear channel in the 5 GHz band to the tethering connection. If the user equipment is unable to find a clear channel in the portion of the 5 GHz band used by the Wi-Fi radio, the user equipment allocates (at block 680) the 2.4 GHz band to the tethering connection.

Some embodiments of user equipment may also choose to power down one or more radios based on a battery level of a battery that provides power to the user equipment, an estimated battery drain rate, or an estimated battery life. For example, the decision to power down one or more radios at block 625 may also take into consideration the battery level, estimated battery drain rate, or estimated battery life and power consumption of the radios under the current channel conditions. The user equipment may notify a corresponding base station that one or more radios have been powered down and the corresponding wireless connections in the wireless backhaul connection torn down.

Figure 7:
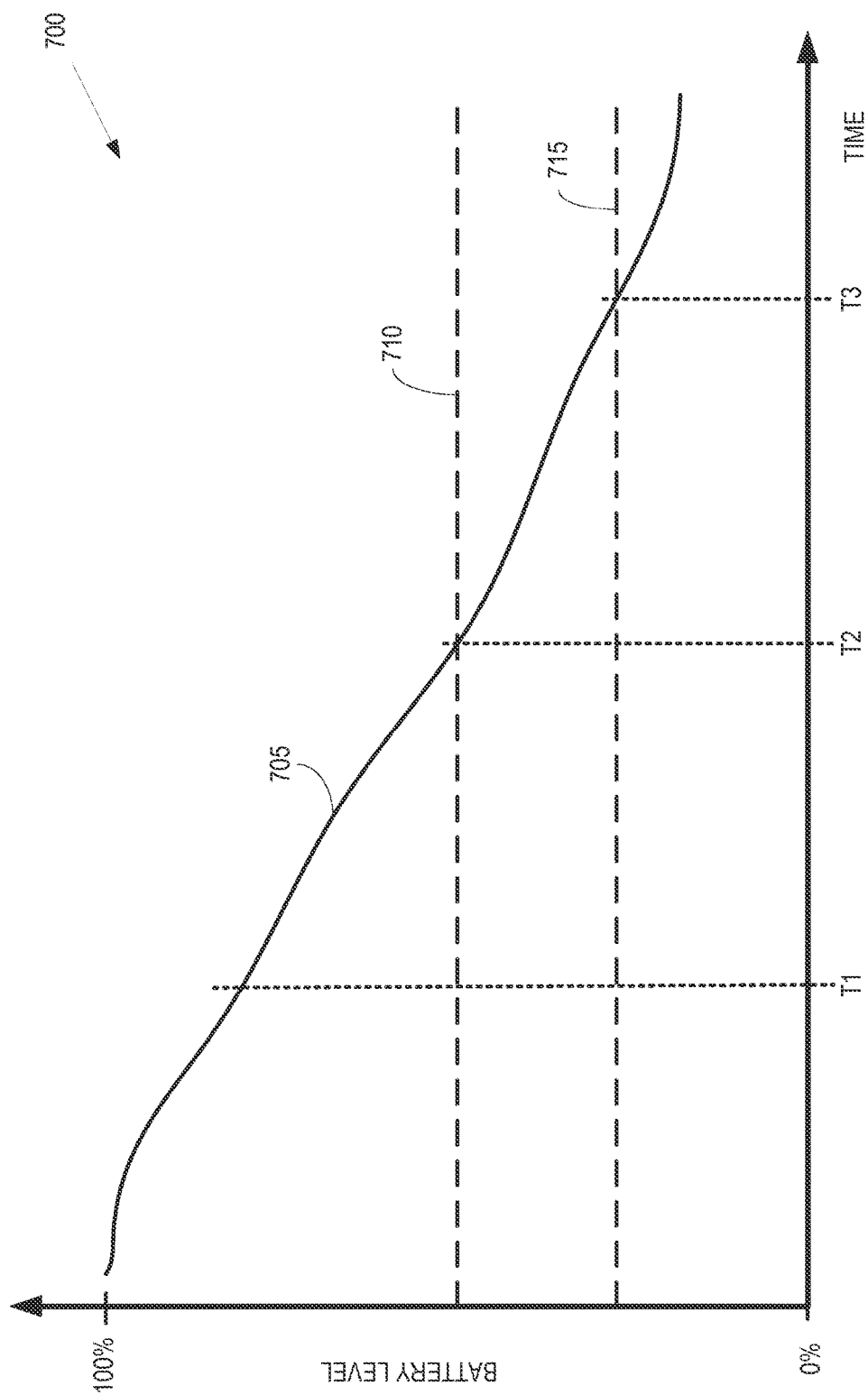
FIG. 7 is a plot of a battery level of a battery in user equipment according to some embodiments.

FIG. 7 is a plot 700 of a battery level of a battery in user equipment according to some embodiments. The vertical axis indicates a charging or power level of a battery as a percentage of a full charge or power level of the battery. The horizontal axis indicates time in arbitrary units increasing from left to right. User equipment such as the user equipment 140, 145 shown in FIG. 1 may measure a battery level 705 as part of a method for allocating unlicensed frequency bands to a tethering connection and a wireless backhaul connection, as discussed herein.

At time T1, the user equipment measures the battery level 705 and determines that it is above a first threshold 710, which indicates that there is sufficient power to operate multiple radios in the user equipment. For example, battery levels above the first threshold 710 may indicate that there is sufficient power to operate radios for LTE-L, LTE-U, and Wi-Fi. The user equipment may therefore use this information to determine the available wireless connections for a wireless backhaul connection, e.g., as shown in block 605 of FIG. 6.

At time T2, the user equipment measures the battery level 705 and determines that it is below the first threshold 710, which indicates that there is not sufficient power to operate all the radios in the user equipment. However, the measured battery level 705 is above the second threshold 715, which indicates that there is sufficient power to operate a radio in the licensed frequency band and a radio in the unlicensed frequency band. For example, the measured battery level 705 may indicate that there is sufficient power to operate an LTE-L radio and either the LTE-U radio or the Wi-Fi radio. One of the radios may be left on to support communication in the unlicensed frequency band and the other radio may be turned off to conserve battery power. The user equipment may use this information to determine the available wireless connections for a wireless backhaul connection, e.g., as shown in block 605 of FIG. 6, or to decide whether to power down a radio, e.g., as shown in block 625 of FIG. 6.

At time T3, the user equipment measures the battery level 705 and determines that it is below the first threshold 715, which indicates that there is not sufficient power to operate the radios that support communication in the unlicensed frequency bands. The user equipment may use this information to determine the available wireless connections for a wireless backhaul connection, e.g., as shown in block 605 of FIG. 6, or to decide whether to power down a radio, e.g., as shown in block 625 of FIG. 6.

Figure 8:
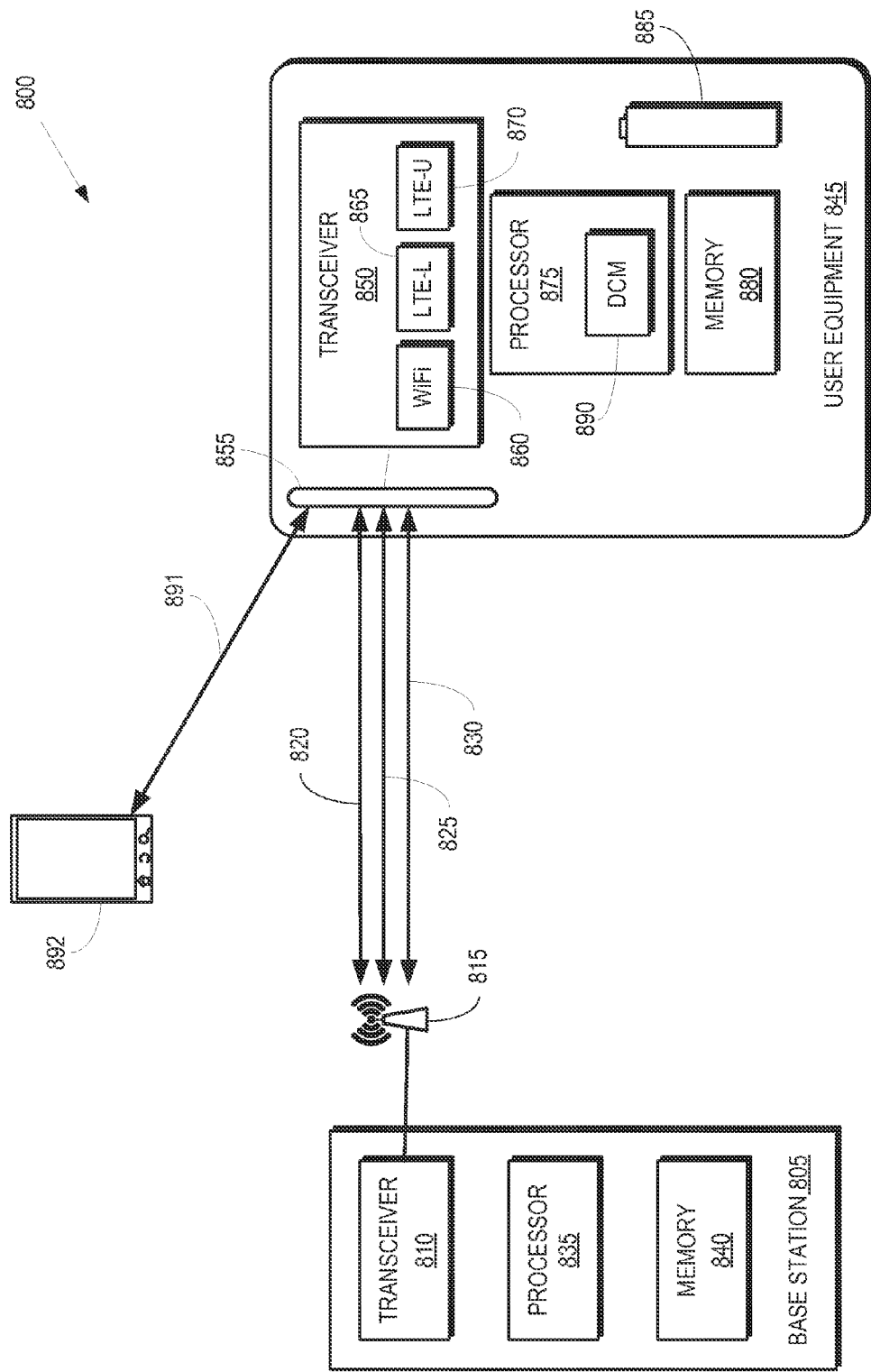
FIG. 8 is a block diagram of a communication system according to some embodiments.

FIG. 8 is a block diagram of a communication system 800 according to some embodiments. The communication system 800 includes a base station 805 that operates according to multiple radio access technologies. For example, the base station 805 may be an integrated device that implements LTE communication and a Wi-Fi access point. For another example, the base station 805 may be representative of co-located devices that support LTE communication and a Wi-Fi access point. Some embodiments of the base station 805 may be used to implement the small cell 115 shown in FIG. 1, the small cell 315 shown in FIG. 3, or the small cell 415 shown in FIG. 4. The base station 805 includes a transceiver 810 for transmitting and receiving signals using one or more antennas 815. The signals may include uplink or downlink signals transmitted over an LTE-L carrier 820 in a licensed frequency band, over an LTE-U carrier 825 in an unlicensed frequency band, or over a Wi-Fi carrier 830 in an unlicensed frequency band. The carriers 820, 825, 830 may be aggregated to increase the total bandwidth provided by the base station 805. The LTE base station 805 also includes a processor 835 and a memory 840. The processor 835 may be used to execute instructions stored in the memory 840 and to store information in the memory 840 such as the results of the executed instructions. Some embodiments of the processor 835 and the memory 840 may be configured to perform portions of the method 600 shown in FIG. 6.

The communication system 800 includes user equipment 845. The user equipment 845 includes a transceiver 850 for transmitting and receiving signals via antenna 855. Some embodiments of the transceiver 850 include multiple radios for communicating according to different radio access technologies such as a Wi-Fi radio 860, a radio 865 for communication in licensed LTE frequency bands (LTE-L), and a radio 870 for communication in unlicensed LTE frequency bands (LTE-U). For example, the LTE-L radio 865 in the user equipment 845 may communicate with the base station 805 using the LTE-L carriers 820 in the licensed frequency band. The LTE-U radio 870 in the user equipment 845 may communicate with the base station 805 using the LTE-U carriers 825 in the unlicensed frequency band. The user equipment 845 may also communicate with the (integrated or co-located) Wi-Fi access point in the base station 805 using the Wi-Fi radio 860 in the user equipment 845.

The user equipment 845 may establish a tethering connection 891 with another user equipment 892. For example, the Wi-Fi radio 860 may be used to establish the tethering connection 891 with the user equipment 892. The user equipment 845 may also aggregate the LTE-L carriers 820 in the licensed frequency band with one or more of the LTE-U carriers 825 and the Wi-Fi carrier 830 in the unlicensed frequency band to form a wireless backhaul connection to the base station 805.

The user equipment 845 also includes a processor 875, a memory 880, and a battery 885 to provide power to the user equipment 845. The processor 875 may be used to execute instructions stored in the memory 880 and to store information in the memory 880 such as the results of the executed instructions. Some embodiments of the processor 875, the memory 880, and the battery 885 may be configured to perform portions of the method 600 shown in FIG. 6. For example, the processor 875 may implement a device connection manager (DCM) 890 to control operation of the transceiver 850 and the radios 860, 865, 870. The DCM 890 may selectively allocate unlicensed frequency bands to the tethering connection and the wireless backhaul connections, as discussed herein. The DCM 890 may selectively power up, power down, activate, deactivate, or reactivate one or more of the radios 865, 870 that operate in the unlicensed frequency band, as discussed herein. Some embodiments of the DCM 890 may perform the selective powering up, powering down, activation, deactivation, or reactivation based on battery levels, a battery drain rate, or a battery lifetime of the battery 885.

In some embodiments, certain aspects of the techniques described above may implemented by one or more processors of a processing system executing software. The software comprises one or more sets of executable instructions stored or otherwise tangibly embodied on a non-transitory computer readable storage medium. The software can include the instructions and certain data that, when executed by the one or more processors, manipulate the one or more processors to perform one or more aspects of the techniques described above. The non-transitory computer readable storage medium can include, for example, a magnetic or optical disk storage device, solid state storage devices such as Flash memory, a cache, random access memory (RAM) or other non-volatile memory device or devices, and the like. The executable instructions stored on the non-transitory computer readable storage medium may be in source code, assembly language code, object code, or other instruction format that is interpreted or otherwise executable by one or more processors.

A computer readable storage medium may include any storage medium, or combination of storage media, accessible by a computer system during use to provide instructions and/or data to the computer system. Such storage media can include, but is not limited to, optical media (e.g., compact disc (CD), digital versatile disc (DVD), Blu-Ray disc), magnetic media (e.g., floppy disc, magnetic tape, or magnetic hard drive), volatile memory (e.g., random access memory (RAM) or cache), non-volatile memory (e.g., read-only memory (ROM) or Flash memory), or microelectromechanical systems (MEMS)-based storage media. The computer readable storage medium may be embedded in the computing system (e.g., system RAM or ROM), fixedly attached to the computing system (e.g., a magnetic hard drive), removably attached to the computing system (e.g., an optical disc or Universal Serial Bus (USB)-based Flash memory), or coupled to the computer system via a wired or wireless network (e.g., network accessible storage (NAS)).

Note that not all of the activities or elements described above in the general description are required, that a portion of a specific activity or device may not be required, and that one or more further activities may be performed, or elements included, in addition to those described. Still further, the order in which activities are listed are not necessarily the order in which they are performed. Also, the concepts have been described with reference to specific embodiments. However, one of ordinary skill in the art appreciates that various modifications and changes can be made without departing from the scope of the present disclosure as set forth in the claims below. Accordingly, the specification and figures are to be regarded in an illustrative rather than a restrictive sense, and all such modifications are intended to be included within the scope of the present disclosure.

Benefits, other advantages, and solutions to problems have been described above with regard to specific embodiments. However, the benefits, advantages, solutions to problems, and any feature(s) that may cause any benefit, advantage, or solution to occur or become more pronounced are not to be construed as a critical, required, or essential feature of any or all the claims. Moreover, the particular embodiments disclosed above are illustrative only, as the disclosed subject matter may be modified and practiced in different but equivalent manners apparent to those skilled in the art having the benefit of the teachings herein. No limitations are intended to the details of construction or design herein shown, other than as described in the claims below. It is therefore evident that the particular embodiments disclosed above may be altered or modified and all such variations are considered within the scope of the disclosed subject matter. Accordingly, the protection sought herein is as set forth in the claims below.

What is claimed is:

1. A method comprising:
aggregating, at a first user equipment, connections in at least one of a first unlicensed frequency band and a second unlicensed frequency band with a connection in a licensed frequency band to form a wireless backhaul connection to the first user equipment; and
selectively allocating, at the first user equipment, a third unlicensed frequency band to a tethering connection that provides wireless connectivity to a second user equipment, wherein the third unlicensed frequency band is selectively allocated in response to the third unlicensed frequency band having a predetermined level of isolation from the licensed frequency band and the at least one of the first unlicensed frequency band and the second unlicensed frequency band.

2. The method of claim 1, further comprising:
establishing a communication pathway between the second user equipment and a server via the first user equipment using the tethering connection and the wireless backhaul connection.

3. A method comprising:
aggregating, at a first user equipment, connections in at least one of a first unlicensed frequency band and a second unlicensed frequency band with a connection in a licensed frequency band to form a wireless backhaul connection to the first user equipment, wherein aggregating the connections in the at least one of the first unlicensed frequency band and the second unlicensed frequency band with the connection in the licensed frequency band comprises aggregating connections in the first and second unlicensed frequency bands with the connection in the licensed frequency band in response to the first and second unlicensed frequency bands satisfying an isolation requirement between a first radio that operates in the first unlicensed frequency band according to a first radio access technology (RAT) and a second radio that operates in the second unlicensed frequency band according to a second RAT; and
selectively allocating, at the first user equipment, a third unlicensed frequency band to a tethering connection.

4. The method of claim 3, further comprising:
selectively powering down the first radio or the second radio in response to the first and second unlicensed frequency bands not satisfying the isolation requirement.

5. The method of claim 4, wherein powering down the first radio or the second radio comprises selectively powering down the first radio or the second radio based on a signal strength or channel quality of signals received in the first unlicensed frequency band and the second unlicensed frequency band.

6. The method of claim 3, wherein the tethering connection is provided by the first radio according to the first RAT, and wherein allocating the third unlicensed frequency band to the tethering connection comprises allocating a third unlicensed frequency band that is different than the first unlicensed frequency band to the tethering connection in response to the connection in the first unlicensed frequency band being disabled.

7. The method of claim 6, wherein allocating the third unlicensed frequency band to the tethering connection comprises allocating at least one channel in the first unlicensed frequency band to the tethering connection in response to the connection in the first unlicensed frequency band being enabled and the connection in the second unlicensed frequency band being disabled.

8. The method of claim 7, wherein allocating the third unlicensed frequency band to the tethering connection comprises allocating the at least one channel in the first unlicensed frequency band to the tethering connection in response to the connection in the first unlicensed frequency band being enabled, the connection in the second unlicensed frequency band being enabled, and the at least one channel in the first unlicensed frequency band being clear.

9. The method of claim 8, wherein allocating the third unlicensed frequency band to the tethering connection comprises allocating the third unlicensed frequency band that is different than the first unlicensed frequency band to the tethering connection in response to the connection in the first unlicensed frequency band being enabled, the connection in the second unlicensed frequency band being enabled, and no channels in the first unlicensed frequency band being clear.

10. The method of claim 1, wherein further comprising: multiplexing data packets conveyed over the connections in the at least one of the first unlicensed frequency band and the second unlicensed frequency band and the connection in the licensed frequency band.

11. User equipment comprising:
a transceiver to aggregate connections in at least one of a first unlicensed frequency band and a second unlicensed frequency band with a connection in a licensed frequency band to form a wireless backhaul connection to the user equipment; and
a processor to selectively allocate a third unlicensed frequency band to a tethering connection that provides wireless connectivity to at least one other user equipment, wherein the processor is to selectively allocated the third unlicensed frequency band in response to the third unlicensed frequency band having a predetermined level of isolation from the licensed frequency band and the at least one of the first unlicensed frequency band and the second unlicensed frequency band.

12. The user equipment of claim 11, wherein the transceiver is to establish a communication pathway between the at least one other user equipment and a server using the tethering connection and the wireless backhaul connection.

13. User equipment comprising:
a transceiver to aggregate connections in at least one of a first unlicensed frequency band and a second unlicensed frequency band with a connection in a licensed frequency band to form a wireless backhaul connection to the user equipment;
a processor to selectively allocate a third unlicensed frequency band to a tethering connection;
a first radio that operates in the first unlicensed frequency band according to a first radio access technology (RAT); and
a second radio that operates in the second unlicensed frequency band according to a second RAT, wherein the transceiver is to aggregate connections in the first and second unlicensed frequency bands with the connection in the licensed frequency band in response to the first and second unlicensed frequency bands satisfying an isolation requirement between the first radio and the second radio.

14. The user equipment of claim 13, wherein the transceiver is to power down the first radio or the second radio in response to the first and second unlicensed frequency bands not satisfying the isolation requirement.

15. The user equipment of claim 14, wherein the transceiver is to selectively power down the first radio or the second radio based on a signal strength or channel quality of signals received in the first unlicensed frequency band and the second unlicensed frequency band.

16. The user equipment of claim 13, wherein the tethering connection is provided by the first radio according to the first RAT, and wherein the transceiver is to allocate a third unlicensed frequency band that is different than the first unlicensed frequency band to the tethering connection in response to the connection in the first unlicensed frequency band being disabled.

17. The user equipment of claim 16, wherein the transceiver is to allocate at least one channel in the first unlicensed frequency band to the tethering connection in response to the connection in the first unlicensed frequency band being enabled and the connection in the second unlicensed frequency band being disabled.

18. The user equipment of claim 17, wherein the transceiver is to allocate the at least one channel in the first unlicensed frequency band to the tethering connection in response to the connection in the first unlicensed frequency band being enabled, the connection in the second unlicensed frequency band being enabled, and the at least one channel in the first unlicensed frequency band being clear.

19. The user equipment of claim 18, wherein the transceiver is to allocate the third unlicensed frequency band that is different than the first unlicensed frequency band to the tethering connection in response to the connection in the first unlicensed frequency band being enabled, the connection in the second unlicensed frequency band being enabled, and no channels in the first unlicensed frequency band being clear.

20. The user equipment of claim 11, wherein the transceiver is to multiplex data packets conveyed over the connections in the at least one of the first unlicensed frequency band and the second unlicensed frequency band and the connection in the licensed frequency band.

* * * * *

UNITED STATES PATENT AND TRADEMARK OFFICE
CERTIFICATE OF CORRECTION

PATENT NO. : 9,775,153 B2
APPLICATION NO. : 14/607772
DATED : September 26, 2017
INVENTOR(S) : Mohammad R. Khawer et al.

Page 1 of 1

It is certified that error appears in the above-identified patent and that said Letters Patent is hereby corrected as shown below:

In the Claims

Column 15, Claim 11, Line 15, please delete "selectively allocated" and substitute -selectively allocate-.

Signed and Sealed this
Third Day of September, 2019

Andrei Iancu
*Director of the United States Patent and Trademark Office*